United States Patent [19]

Carrero

[11] 4,005,673
[45] Feb. 1, 1977

[54] AIR PROPULSION DEVICE FOR SURFACE CRAFT

[75] Inventor: Alfred V. Carrero, Miami, Fla.

[73] Assignee: Lawrence Peska Associates, Inc., New York, N.Y. ; a part interest

[22] Filed: Mar. 10, 1976

[21] Appl. No.: 665,578

[52] U.S. Cl. .............................................. 115/1 C
[51] Int. Cl.$^2$ ........................................ B60F 3/00
[58] Field of Search ................. 115/1 R, 11, 3, 17; 248/4; 9/1.7; 244/23 R; 114/67 A

[56] References Cited

UNITED STATES PATENTS

| 572,568 | 12/1896 | Robertson | 115/1 C |
|---|---|---|---|
| 1,180,430 | 4/1916 | Riedel | 115/1 C |
| 1,443,368 | 1/1923 | Lamblin | 115/1 C |
| 1,834,068 | 12/1931 | Merickle | 115/1 C |
| 2,948,250 | 8/1960 | Peterson | 115/1 C X |
| 2,987,281 | 6/1961 | Schurr et al. | 115/1 C X |
| 3,847,105 | 11/1974 | Kelpin | 115/1 C |

*Primary Examiner* — Trygve M. Blix
*Assistant Examiner* — Sherman D. Basinger

[57] ABSTRACT

This disclosure pertains to an air propulsion device for surface craft having a lateral platform designed to clampingly engage the gunwales of a craft and a clamp to removably attach the platform to the sternmost outboard motor mounting board. A propulsion motor mounting plate is pivotably secured to the lateral platform and is adapted with a pivot handle. The air propulsion motor is mounted atop the motor mounting plate within a triangular shaped supporting structure having, at its apex, a bearing assembly which supports the blade shaft. The entire unit can be assembled onto most small boat shapes when in the water or on land, and can be removed therefrom for repairs or to convert the boat to a conventional outboard driven craft when desired. The entire unit is self contained and the mounted devices employed thereon do not require any permanent modifications to the boat upon which it is to be mounted and operated.

8 Claims, 5 Drawing Figures

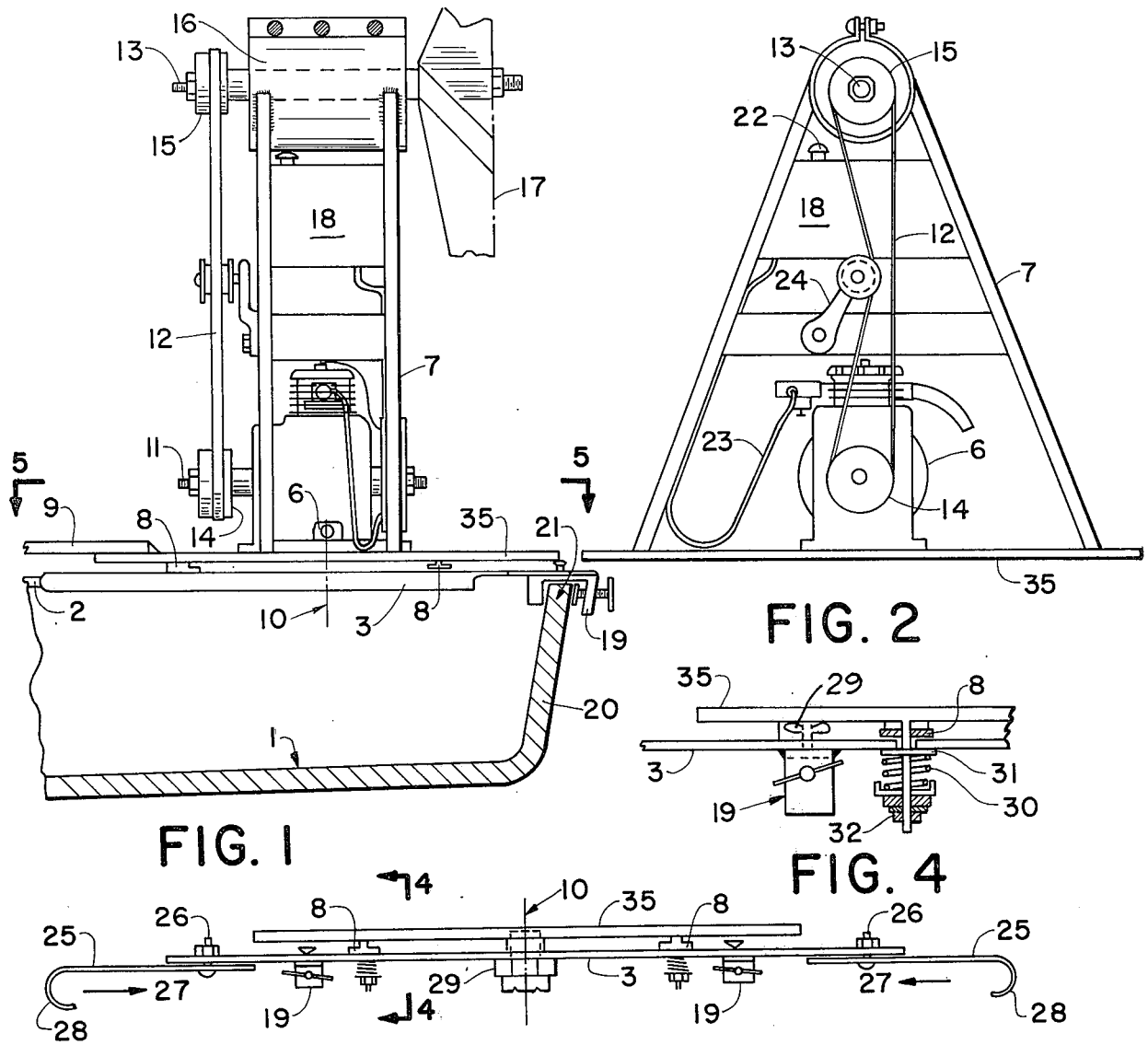

AIR PROPULSION DEVICE FOR SURFACE CRAFT

BACKGROUND OF THE INVENTION

1. The Field of the Invention

This invention relates to air propulsion devices for surface craft and more particularly to that class which is adapted to be installed thereon without employing permanent mounts affixed to the craft to accommodate the propulsion motor.

2. Description of the Prior Art

The prior art, in the main, concerns fastening the air propulsion motor to the transom or rear wall of a boat. U.S. Pat. No. 2,987,281 issued June 6, 1971 to R. K. SCHURR et al teaches a clamp having a lead screw that provides pincer-like forces to the area adjacent the topmost edge of a transom. The air motor is secured to the clamp mechanism through pivot means such that the blade producing the propulsion air currents can have its axis rotated from side to side, permitting thereby, steering-like forces to be imparted to the vessel to which the assembly is attached. U.S. Pat. No. 1,180,430 issued Apr. 25, 1916 to C. E. PIEDEL shows a similarly equiped assembly having a lateral platform below the motor about which the motor assembly and blade mounting shaft is permitted to pivot. U.S. Pat. No. 3,791,333 issued Feb. 12, 1974 to J. D. LOSCH also shows a propulsion device adapted to be mounted to the rearmost wall of a surface craft, teaching a novel design for the blade. There appears to be no known method heretofore that simply and easily adapts to boats of varied designs and shapes allowing for the mounting, in temporary fashion, of an air propulsion device to other than the transom. Some craft cannot accommodate the size and weight of this form of propulsion on locations other than attachment astern of amidships and forward of the stern proper. Transoms, though designed to securely support outboard engines may not possess the strength capable of adequately supporting the motor as well as vibrating blades suspended a substantial distance above the uppermost edge. The weight of the engine as well as the center of the blade being located substantially above the transom tends to cause the vessel to yaw nose upwards when not in motion. Since the craft may be employed in very shallow water, it is highly desirable to maintain the hull at substantially a horizontal position at all speeds. Locating the propulsion unit at any desired point along the vessel length provides complete flexibility for a single apparatus adapted to be utilized with a variety of craft shapes and sizes.

SUMMARY OF THE INVENTION

A craft engaging platform is provided that may be rested on the gunwales of a surface vessel at any point along the length of the boat. The gunwale's edges are grasped by two downwardly turned lips affixed at the outboard edges of two vessel width adjustment plates. The plates are brought inwardly until the lips engage the outboard walls of the vessel adjacent the gunwale edges. A transom engaging clamp is provided to prevent inadvertant motion between the point selected for mounting and other locations forward or astern therefrom. The craft engaging platform is attached to the plates and the clamp by bolts passing through slots, allowing thereby a wide variety of vessels to be accommodated. A motor mounting platform is located above the craft engaging platform and is adapted to pivot about a vertical axis therefrom. The propulsion motor is fastened to the mounting platform within an air blade shaft supporting structure. The motor and blade, including the shaft supporting structure is adapted to pivot as a unit about the pivot axis as controlled by a steering shaft extending forward of the forwardmost edge of the motor mounting platform, lying in a substantially horizontal plane. Bearing surfaces are provided in cluster fashion about the pivot axis lending lateral stability to the motor mounting platform by resting upon the uppermost surface of the craft engaging platform. The bearing surfaces are equiped with shafts, normal thereto, passing through arcuately shaped slots in the craft engaging platform, limiting thereby the angular rotation capabilities of the motor and blade assembly relative to the longitudinal axis of the vessel.

A primary object of the instant invention is to provide an air propulsion device that can be utilized on all manner of craft having varied beam lengths and vessel hull designs.

Another object is to provide an air propulsion mechanism which can be located at any point along a vessel's length.

Still another object is to provide support to the propulsion device from the craft's gunwales as well as the transom thereof, if so desired.

Yet another object is to provide lateral stability at points located a substantial distance radially outward from the motor mounting pivot axis, yielding thereby a lighter structural fabrication of the component parts thereof.

A further object is to provide a motor mounting location close to the water line and depending structurally from support surfaces attached to the uppermost edges of the gunwales.

Another object is to provide a simple convenient method of attachment of the air propulsion device to a surface craft without employing specially made or integral craft mounting devices permanently affixed to the vessel.

These objects, as well as other objects of this invention, will become readily apparent after reading the following description of the accompanying drawings.

BRIEF DESCRIPTION OF THE DRAWINGS

FIG. 1 illustrates a side elevation view of the propulsion device mounted to a portion of the stern of a surface craft.

FIG. 2 is a front elevation view of the propulsion device illustrated in FIG. 1.

FIG. 3 is a front elevation view of the craft engaging platform having the motor mounting platform pivotably secured thereabove.

FIG. 4 is a cross-sectional view taken along line 4—4 viewed in the direction of arrows 4—4 as shown in FIG. 3 illustrating a portion of the cross-section of the craft engaging platform and the motor mounting platform supported thereabove by a bearing surface having a projection passing through a slot therein.

FIG. 5 is a plan view of the motor mounting platform taken along line 5—5 viewed in the direction of arrows 5—5 as shown in FIG. 1 showing the gunwale edges of the craft and the location of the craft engaging platform relative thereto.

DESCRIPTION OF THE PREFERRED EMBODIMENT

The structure and method of fabrication of the present invention is applicable to an air propulsion device utilized to propel small surface vessels on shallow or deep water. The craft supports a craft engaging platform from the gunwale edges. Two gunwale clamping plates engage the sides of the vessel outboard and adjacent to the gunwale edges and are secured to the craft engaging platform by a number of bolts passing through slots in the craft engaging platform whose longitudinal axes are in a line perpendicular to the gunwales. Additional slots in the craft engaging platform, whose longitudinal axes run along a direction parallel to the gunwales, engage bolts fastened to transom engaging clamps. The location of the craft engaging platform can be varied along the length of the vessel, forward of the transom, and even trimmed by locating at a point abeam of amidships if so desired, by judicious use of the gunwale engaging plate slots and the transom clamp slots.

A pivot point, whose axis is normal to the uppermost surface of the craft engaging platform, determines the pivot axis of a motor mounting platform located above and parallel to the craft engaging platform. Slots, having curved axes, are located radially outwardly from the pivot axis in the craft engaging platform. There are an equivalent number of bearing surfaces depending from below the lowermost surface of the motor mounting platform resting upon the craft engaging platform's uppermost surface. Shafts, whose longitudinal axes are normal to the bearing surfaces and pass therethrough, continue on through the curved slots and are adapted with helical springs at the free ends thereof such that a lowermost bearing surface engages the lowermost surface of the craft engaging platform. Nuts adjust the spring compression, which forces both types of bearing surfaces to frictionally engage the lateral surfaces of the craft engaging platform.

The motor mounting platform supports a conically shaped blade shaft bearing structure thereabove. The motor is mounted directly upon the motor mounting platform, thus keeping the center of gravity of the propulsion apparatus as low as possible. The blade supporting axle is mounted in its bearing near the apex of the conical supporting structure having the rotational axis of the blade lying in a plane substantially parallel to the plane defining the uppermost surface of the motor mounting platform and the longitudinal axis of the axle running substantially parallel to the output shaft of the motor. A belt couples the motor shaft to the axle utilizing suitable pulleys and a belt tensioning idler positioned along a run of the belt intermediate the pulleys. The fuel tank, if a combustion engine is employed, is located intermediate the top of the engine and the axle bearing assembly. The blade is fastened to the sternmost free end of the axle and the air stream generated therefrom may be directed by pivotably rotating the engine, conical supporting structure, and axle bearing assembly about the pivot axis by employing a manually operated steering arm depending horizontally forward from the forward most edge of the motor mounting platform.

The entire assembly comprising the air propulsion device disclosed herein, can, when detached from the vessel, rest upon a horizontal surface in an operating mode facilitating repairs and convenient transportation. The lowermost free ends of the blade are protected from inadvertant contact with the ground or other horizontal surface being used to support the propulsion unit.

Now referring to the Figures, and more particularly to the embodiment illustrated in FIG. 1 showing a portion of the rear of a vessel 1 in a side elevation view. Gunwale 2 supports the craft engaging platform 3. Motor mounting platform 35 supports a motor 6 located at the lowermost portions of structure 7. Bearing pads 8 support the motor mounting platform above the lateral surface of the craft engaging platform 3. Steering rod 9 controls the rotation of motor mounting platform 35 about a pivot point whose longitudinal axis lies on line 10. Output shaft 11 of motor 6 is connected by belt 12 to blade axle 13 utilizing pulleys 14 and 15. Axle 13 is supported in bearing assembly structure 7 having blade 17 mounted at the rearmost free end thereof. Gas tank 18 supplies fuel to engine 6 and is mounted intermediate the axle and the top of the motor. Transom clamp 19 engages the transom 20 by grasping opposed surfaces adjacent the uppermost rim 21 thereof.

FIG. 2 illustrates the front elevation view of structure 7 showing motor 6 mounted near the base thereof. Gas tank 18 is provided with a filler cap 22, and feeds the motor through fuel line 23. Idler 24 applies tensioning forces to belt 12 such that there is a minimum of slippage upon pulleys 14 and 15.

FIG. 3 illustrates the craft engaging platform 3 having gunwale engaging plates 25 attached to the side edges thereof by bolts 26. Plates 25 can be adjustably secured inboard along the direction of arrows 27 by loosening bolts 26 and relocating plates 25 until a point is reached that the turned down edges 28 of plate 25 come into contact with the gunwales, not shown. Bolts 26 are then tightened, securing the craft engaging platform to the vessel's gunwales. Pivot assembly 29 enables motor mounting platform 35 to rotate about line 10 when being supported on craft engaging platform 3 by bearing surfaces 8.

FIG. 4 is a cross-sectional view taken along line 4—4 viewed in the direction of arrows 4—4 as shown in FIG. 3 illustrating transom clamp 19 adjustably secured to craft engaging platform 3 by bolt 29. The lowermost surface of bearing pad 8 rests upon the uppermost surface of craft engaging platform 3 having a downward component of force provided by the spring 30, which in turn forces bearing pad 31 upward dependent upon the position of nut 32 which biases the spring an adjustable amount.

FIG. 5 illustrates a cross-sectional view, looking downwards, taken along line 5—5 viewed in the direction of arrows 5—5 as shown in FIG. 1 showing the craft engaging platform 3 and the associated side gunwale engaging plates 25 attached thereto. Slots 32 permit the adjustment abeam the vessel whose gunwales are depicted by numeral 2 and whose uppermost edge of the transom is depicted by numeral 20'. Slots 33 enable transom engaging clamps 19 to be adjustable secured to platform 3 when bolts 29 are tightened. The proper use of slots 33 enable the user to locate the craft engaging platform at any desired point along the length of the vessel. Curved slots 34 are utilized to locate the shafts passing through spring 30, as shown in FIG. 4 and prevent the excessive rotation about pivot assembly 29, when manipulating handle 9.

One of the advantages is to provide an air propulsion device that can be utilized on all manner of craft having varied beam lengths and vessel hull designs.

Another advantage is an air propulsion mechanism which can be located at any point along a vessels length.

Still another advantage is support to the propulsion device from the craft's gunwales as well as the transom thereof, if so desired.

Yet another advantage is lateral stability at points located a substantial distance radially outward from the motor mounting pivot axis, yielding thereby a lighter structural fabrication of the component parts thereof.

A further advantage is a motor mounting location close to the water line and depending structurally from support surfaces attached to the uppermost edges of the gunwales.

Another advantage is a simple convenient method of attachment of the air propulsion device to a surface craft without employing specially made or integral craft mounting devices permanently affixed to the vessel.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by the specific disclosure herein, but only by the appending claims.

The embodiment of the invention in which an exclusive privilege or property is claimed are defined as follows:

1. An air propulsion device for surface craft comprising a lateral craft engaging platform having gunwale engaging means to removably engage opposing outboard gunwale sides of a craft and bulkhead engaging means to removably engage a bulkhead athwart said gunwales at a point astern of said gunwale engaging means, a pivot point having a pivot axis normal to said lateral craft engaging platform located substantially centered between said gunwales and forward of said bulkhead, a lateral propulsion device mounting platform pivotably secured to said lateral craft engaging platform normal to said pivot axis, means to rotate said lateral propulsion device mounting platform about said pivot axis, engine means adapted to mount to said lateral propulsion device mounting platform, said engine means rotatably adapted to drive a horizontal shaft whose longitudinal axis is substantially parallel to said lateral propulsion device mounting platform and having an air propulsion blade extending radially outwardly therefrom.

2. The air propulsion device for surface craft as claimed in claim 1 wherein said gunwale engaging means comprises two lateral surfaces with downward turned edges adapted to engage said gunwales on the outboard edges thereof, means to dispose said two lateral surfaces along a line substantially transverse to the longitudinal axis of said gunwales, means to adjustably fixedly secure said two lateral surfaces to said lateral craft engaging platform along said line.

3. The air propulsion device for surface craft as claimed in claim 1 wherein said engine means comprises a belt coupled to the surface of an outboard shaft of an engine having an axis parallel to said lateral craft engaging platform, said belt adapted to engage the surface of said horizontal shaft and further adapted to have an idler wheel adjustably induce tension forces along a portion of the length thereof.

4. The air propulsion device for surface craft as claimed in claim 1 further comprising means to apply manually adjustable friction forces between said lateral craft engaging platform and said lateral propulsion device mounting platform frictionally opposing the rotation of said lateral propulsion device mounting platform about said pivot axis.

5. The air propulsion device for surface craft as claimed in claim 1 wherein said means to rotate said lateral propulsion device mounting platform about said pivot axis comprises a longitudinal handle fixedly secured thereto extending forward from a forwardmost edge of said lateral propulsion device mounting platform.

6. The air propulsion device for surface craft as claimed in claim 1 wherein said horizontal shaft is rotatably secured to a triangularly shaped supporting structure adapted to have the lowermost edge thereof parallel to said lateral propulsion device mounting platform and the apex thereof located above said lateral propulsion device mounting platform, said engine means substantially located within said triangularly shaped supporting structure mounted at a point below said horizontal shaft.

7. The air propulsion device for surface craft as claimed in claim 1 wherein said bulkhead engaging means comprises the application of pincer-like forces on opposite surfaces of said bulkhead applied by at least one pair of opposed clamping surfaces, one of said pair of clamping surfaces fixedly secured substantially normal to said lateral craft engaging platform, the other of said pair of clamping surfaces manually adjustably disposed parallel to said one of said pair of clamping surfaces a distance controlled by manually rotating a threaded rod having a longitudinal axis substantially perpendicular to said pair of clamping surfaces.

8. The air propulsion device for surface craft as claimed in claim 1 wherein said bulkhead is the transom of said craft.

* * * * *